United States Patent [19]

Sundie et al.

[11] 4,139,507

[45] Feb. 13, 1979

[54] ONE-COMPONENT BINDER FOR FIBERBOARD

[75] Inventors: Richard D. Sundie, Montvale; William R. Michael, West Orange; Harry E. Ulmer, Morristown, all of N.J.

[73] Assignee: Allied Chemical Corporation, Morris Township, Morris County, N.J.

[21] Appl. No.: 868,958

[22] Filed: Jan. 12, 1978

[51] Int. Cl.$^2$ ............................................. C08L 61/20
[52] U.S. Cl. ........................... 260/29.4 R; 260/45.9 L
[58] Field of Search ........... 260/29.4 R, 70 M, 45.9 L

[56] References Cited

U.S. PATENT DOCUMENTS

| | | | |
|---|---|---|---|
| 2,085,492 | 2/1936 | Ellis | 260/29.4 R |
| 3,883,462 | 5/1975 | Pearson | 260/29.4 R |
| 3,962,166 | 6/1976 | Gordon | 260/29.4 R |

*Primary Examiner*—J. Ziegler
*Attorney, Agent, or Firm*—Alan M. Deornberg; Henry E. Naylor; Jay P. Friedenson

[57] ABSTRACT

A one-component curable amino resin binder system is disclosed for use in the preparation of fiberboard and other products wherein the binder system comprises formaldehyde, urea, an oxime compound soluble in the binder system, and optionally a water miscible alcohol and or melamine.

6 Claims, No Drawings

ONE-COMPONENT BINDER FOR FIBERBOARD

BACKGROUND OF THE INVENTION

1. Field of the Invention

This invention relates to a stable, one component, curable, amino resin binder system useful in the production of fiberboard and other wood and paper products and to its method of manufacture.

2. Discussion of the Prior Art

Curable amino resin binder systems comprised of an aqueous solution of urea, formaldehyde and melamine are known in the art and have met with substantial commercial success in the production of fiberboard.

U.S. Pat. No. 3,629,176 to Shriver, teaches an amino resin binder system useful for the production of fiberboard and plywood. Melamine, and optionally urea and water, are added at a temperature less than about 5° C. to a urea-formaldehyde reaction product to obtain a slurry which can be employed to bond fiberboard and the like. This system is relatively unstable and therefore must be formulated in the fiberboard plant since the solids of the slurry will separate out after a relatively short period of time thereby precluding shipment of such a product as a one-component, ready-to-use system.

U.S. Pat. No. 3,458,464 to Shriver et al. discloses aqueous urea-formaldehyde-melamine concentrates in which melamine and urea are added to an aqueous formaldehyde solution which is heated and then concentrated after cooling. Athough it is suggested in this patent that urea and melamine may be dissolved in the solution to obtain a reaction mixture useful in producing adhesives, molding powders and fabric-treating resins, the concentrate itself contains a very large amount of formaldehyde in order to increase its stability while containing a very small amount of melamine. Consequently, there is an odor problem associated with the large amount of formaldehyde. The system as envisioned in the Shriver et al. patent is at least a three-component system wherein urea and melamine plus the urea-formaldehyde-melamine concentrate are employed. Moreover, it has been found that the product of Shriver et al. becomes unstable (i.e., becomes solid) after about three days storage.

U.S. Pat. No. 2,085,492 to Ellis discloses carrying out the reaction of urea and acid-containing methanolic formaldehyde in the presence of additional methanol solvent or other volatile diluents which are miscible with water in order to lessen the thermal effect of the reaction and to obtain a soluble product. The solvent is recovered after the reaction is completed.

Attempts have also been made to stabilize the amino resin slurry. For example, U.S. Pat. No. 3,826,770 to Christensen et al. discloses urea-formaldehyde aqueous concentrates useful in the manufacture of particle board and the like, which contain an ionized inorganic salt and optionally an alcohol as a stabilizer. This system is not a solution, does not contain melamine, and is not as stable as the binder systems of the present invention.

Australian patent application No. 60,444 to Montecatini discloses a melamine-formaldehyde solution in a hydroalcoholic medium, such as methanol, which contains an aromatic sulfamide as the stabilizing agent and British Plastics, August 1953 (pages 306–308) discloses aqueous melamine-formaldehyde syrups which are stabilized against gellation and precipitation by the incorporation of an alcohol and borax. These solutions or syrups do not contain urea and therefore are significantly easier to stabilize than a binder system containing urea.

Most of the above-identified prior art references have contributed to the art by teaching the production of slurries or solutions having various degrees of stability. But, none of these references teach the preparation of a binder solution that would be stable for a long enough period of time so that it could be shipped, as one component, to fiberboard manufacturing facilities and stored for commercially practical times.

U.S. Pat. No. 3,891,590 to Sundie et al. advanced the art by teaching the preparation of a two-component system which could be stored and shipped separately, from which curable amino resins could be easily prepared without serious mixing problems and duplication of mixing machinery. The amino resin system taught in U.S. Pat. No. 3,891,590 is not necessarily suitable for an exterior grade fiberboard whereas U.S. application No. 696,159, filed June 14, 1976 discloses an amino resin which is suitable for exterior grade fiberboard.

The present invention solves the prior art problem of stability of the amino resin binder system as well as the problem of requiring the shipment of at least two separate components for preparing a stable binder suitable for commercial use.

SUMMARY OF THE INVENTION

In accordance with this invention there is provided a one component, stable, curable amino resin binder system comprising urea, formaldehyde, an oxime compound soluble in the binder system, a buffering agent and optionally a water miscible $C_1$ to $C_5$ alcohol compound and/or melamine.

The binder systems as taught herein are stable for as long as about one and a half months. They can be easily shipped as a one-component system for commercial use without the necessity of adding a catalyst to initiate curing.

DETAILED DESCRIPTION OF THE INVENTION

Formaldehyde solutions suitable for use in the present invention can be any available industrial grade formaldehyde preferably having a low acid content. More preferred is formaldehyde having an acid content of less than about 0.03 wt. %.

Urea and melamine suitable for use herein can also be of any available industrial grade. It is preferred that the urea is not of the fertilizer grade which contains a coating of various inorganic substances.

Any oxime can be used to stabilize the present amino resin binder system as long as the oxime or a reaction product thereof is soluble in the binder system. Generally such oximes are those oximes which are soluble in water. It will be noted that oximes which are normally insoluble in water, but which can react with one or more of the binder ingredients to form a reaction product which is soluble in the binder system, are also suitable for use herein. By soluble in water or in the binder system we mean that at least 10 wt % of the oxime or oxime reaction product dissolves in water or the binder system at room temperature (20° C.). Non-limiting examples of such oximes are:

(1) The binder soluble aldoximes, preferably represented by the formula

where R is hydrogen or an alkyl group having 1 to 5 carbon atoms, an alkenyl group having 2 to 5 carbon atoms, or a phenyl group. Illustrative of such oximes are formaldoxime, acetaldoxime, propionaldoxime, butanaldoxime hexanaldoxime, crotonaldoxime, hexenaldoxime, and benzaldoxime. Preferred are formaldoxime, acetaldoxime, propionaldoxime and butanaldoxime; more preferred are formaldoxime and acetaldoxime; most preferred is acetaldoxime.

(2) The binder soluble ketoximes represented by the formula

where R and R' are independently alkyl groups having 1 to 5 carbon atoms, preferably from 1 to 3 carbon atoms. Illustrative of such oximes are acetoxime, methyl ethyl ketoxime, diethyl ketoxime, methyl propyl ketoxime, ethyl propyl ketoxime, dipropyl ketoxime, dibutyl ketoxime, and 3-methyl-2-butoxime. Preferred are acetoxime, methyl ethyl ketoxime, and diethyl ketoxime, more preferred is acetoxime.

(3) The binder soluble glyoximes represented by the formula

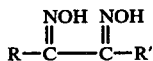

where R and R' are independently hydrogen or alkyl groups having 1 to 3 carbon atoms. Preferred are glyoximes wherein either R or R' are hydrogen such as methyl glyoxime, ethyl glyoxime and propyl glyoxime, more preferred is glyoxime where both R and R' are hydrogen.

(4) The binder-soluble α-hydroxy oximes represented by the formula

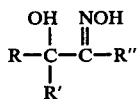

where R, R' and R" are independently hydrogen or an alkyl group having 1 to 3 carbon atoms. Preferred is a α-hydroxy isobutylaldehyde oxime.

(5) Other water or binder soluble oximes such as cyclohexaneoxime, cyclohexanedioxime, cyclohexanetrioxime, furfuraldoxime, caproylaldoxime and suberaldoxime.

Although it is not critical, it is preferred that about 1 to 5 wt. %, preferably 1.5 to 3 wt. %, based on the total weight of ingredients, of a water miscible alcohol compound be added to the reaction mixture in order to further increase the stability of the binder solution. Non-limiting examples of preferred alcohols suitable for use herein are the $C_1$ to $C_5$ aliphatic alcohols and the $C_2$-$C_4$ glycols such as ethylene glycol, propylene glycol, butylene glycol, etc. More preferred are the $C_1$ to $C_5$ aliphatic alcohols and most preferred are methanol and ethanol.

The curable amino resin binder system as described and claimed herein may be prepared by charging the ingredients into a reaction vessel. If melamine is present in undissolved form, the reaction mixture is maintained at an elevated temperature and pressure sufficient with agitation to dissolve the melamine. Generally the temperature can be in a range of about 10° to 95° C., preferably about 20° to 65° C. and the pressure can be in the range of 5 to 50 psi, preferred is atmospheric pressure (about 15 psi). After the melamine has dissolved, the mixture is cooled to room temperature for storage and shipment. If melamine is not used, or if a solution containing melamine dissolved therein is used, the reaction mixture is maintained at room temperature and atmospheric pressure with agitation for a time sufficient to ensure completion of reaction with the oxime compound, generally from about 5 to 15 minutes. It will be noted that in any procedure used to prepare the binder systems of the present invention it is important to maintain the pH of the resulting binder of about 6.5 to 7.5 for optimum stability and pH of about 6.8 to 7.2 is preferred.

Generally, the ingredients are charged, into the reaction vessel, such that the reaction mixture contains about 25 to 50 wt. %, preferably about 30 to 40 wt. % urea; about 40 to 80 wt. %, preferably about 45 to 60 wt. % of a 50% aqueous-50% formaldehyde solution; 0 to 10 wt. %, preferably about 2 to 6 wt. % melamine, a stabilizing amount of an oxime compound soluble in the binder system, and optionally about 1 to 5.0 wt. % of a water miscible alcohol. All weight percents are based on the total weight of ingredients. The term stabilizing amount of oxime compound means that amount of oxime compound required to stabilize the binder systems of the present invention for a minimum of 10 days. Generally about 0.5 wt. % of oxime compound, when incorporated into the present binder systems, will stabilize said binder systems for about 10 to 15 days. To stabilize the present binder system for as long as 40 days or longer, about 5 wt. % of oxime compound is generelly required.

It will be noted that a more convenient way of preparing the presently claimed one-component binder system, is to use commercially available mixtures of the various ingredients. For example a mixture containing 60 wt. % formaldehyde, 25 wt. % urea, and 15 wt. % water is available from Allied Chemical Corporation under the designation U.F. Concentrate-85. Also available from Allied Chemical Corporation is a curable amino resin binder system obtainable under the designation AFS-2C which is composed of two components, I and II. Component I is a mixture containing 84 wt. % U.F. Concentrate-85, 5 wt. % melamine, 10.7 wt. % water and 0.3 wt. % ammonium acetate. Component II is a mixture containing about 49.5 wt. % urea and about 49.5 wt. % water, and about 1.0 wt. % ammonium nitrate. Components I and II and their preparation are more fully described, in U.S. Pat. No. 3,891,590 to Sundie et al. and U.S. application No. 696,159 both of which are incorporated herein by reference.

A catalyst can optionally be added to the present binder system to accelerate curing, but must be added just before the binder is used in an article of manufacture owing to the fact that the catalyst has an adverse affect on the stability of the binder system. Catalysts suitable for use with the presently claimed binder system can be any of those catalysts conveniently used in the boardmaking industry which promotes the reaction of urea, melamine and formaldehyde. Non-limiting examples of such catalysts include the salts of a weak base and a strong acid such as ammonium chloride, ammonium nitrate, ammonium phosphate, aluminum phosphate, ammonium sulfate, and aluminum ammonium sulfate. Preferred is ammonium nitrate.

Buffering agents suitable for use herein may be any buffering agent which, when present in the amount of 0.1 to 2.0 wt. %, is capable of maintaining the binder system at a pH of about 6.5 to 7.5, preferably about 6.8 to 7.2, more preferrably about 6.9 to 7.1. Preferred buffering agents include boric acid, borax (hydrated sodium borate) and mixtures thereof. Examples of other suitable buffering agents include other inorganic acids such as nitric acid, iodic acid, phosphoric acid, sulfuric acid and hydrochloric acid. Also suitable for use herein as a buffering agent are organic acids such as acetic acid, citric acid, formic acid, oxalic acid, stearic acid and tartaric acid; also, salts of such organic or inorganic acids, preferably salts of an alkali metal (e.g., lithium, sodium and potassium) or an alkaline earth metal (e.g., magnesium, calcium, strontium and barium); also ammonium salts of such organic or inorganic acids such as ammonium borate, ammonium nitrate, ammonium sulfate and ammonium acetate; and mixtures thereof.

The curable amino resins of the present invention can be used to bond fiberboard, particle board, chipboard and other products by conventional boardmaking procedures. For example, fiberboard may be prepared by mixing the resin with particles of mechanically reduced wood fibers, such as spraying the resin onto the particles until the particles become impregnated with the resin; forming the impregnated fibers into a mat; compressing the mat to a desired thickness; and subjecting the mat to suitable curing conditions until the resin is cured and becomes intimately bonded to the fibers. Suitable curing conditions include elevated temperatures and pressures. Pressures of about 400 to 600 psi using press platens heated to about 120° to 200° C. The dwell time in the press platens is related to the type of heating press employed as well as to other factors. Preferably radio frequency heating is employed at a dwell time of about one minute or less. If conventional heating is employed, dwell times of about 5 to 6 minutes are typically required.

In addition, the resins of the present invention may be used as adhesives to improve the dry and wet strengths of paper. The resin can be bonded to organic and inorganic fibers, and mixtures thereof, such as fibers formed from steamed and mechanically and/or chemically reduced cellulosic or lignocellulosic materials such as wood, newspaper, cotton, straw, bamboo, bagasse and sisal and inorganic materials such as asbestos and mineral wood.

Additives such as sizing materials, natural and synthetic waxes, fungicides, natural and synthetic rubber, asphalt and/or coal-tar oils, and drying oils can be combined with the fiber in any conventional way. Preferably such additives are combined with the fiber during the impregnation of the fiber with the resin.

The following non-limiting examples further describe the preferred embodiments of this invention. All parts and percentages are by weight and all properties are determined at 25° C. unless otherwise indicated.

EXAMPLES 1–14

Various samples of amino resin binder solutions were prepared at room temperature (25° C.). The composition of each sample and its resulting stability is set forth in Table I below.

TABLE I

| Ex. | Component I[d] wt. % | Urea Soln[c] wt. % | Oxime wt. % | Methanol Wt. % | pH 25° C. | Vis. at ps 25° C. | Stability days 25° C. |
|---|---|---|---|---|---|---|---|
| 1 | 55.56 | 44.44 | — | — | 7.0 | 12.0 | 10.0 |
| 2 | 52.41 | 41.93 | 4.72[a] | 0.94 | 7.0 | 12.0 | 21.0 |
| 3 | 51.92 | 41.54 | 4.67[a] | 1.87 | 7.05 | 12.0 | 30.0 |
| 4 | 51.44 | 41.15 | 4.63[a] | 2.78 | 7.0 | 12.0 | 34.0 |
| 5 | 54.47 | 43.57 | 1.96[a] | 1.96 | 7.0 | 12.0 | 27.0 |
| 6 | 54.45 | 43.56 | 1.96[a] | 2.94 | 7.05 | 12.0 | 26.0 |
| 7 | 52.41 | 41.93 | 4.72[b] | 0.94 | 7.0 | 12.0 | 21.0 |
| 8 | 51.92 | 41.54 | 4.67[b] | 1.87 | 7.05 | 12.0 | 30.0 |
| 9 | 51.44 | 41.15 | 4.63[b] | 2.78 | 7.0 | 12.0 | 29.0 |
| 10 | 53.94 | 43.15 | 1.94[b] | 0.97 | 7.0 | 12.0 | 21.0 |
| 11 | 54.47 | 43.57 | 1.96[b] | 1.96 | 7.0 | 12.0 | 27.0 |
| 12 | 54.45 | 43.56 | 1.96[b] | 2.94 | 7.0 | 12.0 | 19.0 |
| 13 | 50.50 | 40.40 | 9.09[a] | — | 7.10 | 12.0 | 42.0 |
| 14 | 50.50 | 40.40 | 9.09[a] | — | 7.15 | 12.0 | 42.0 |

[a] = acetoxime
[b] = methyl ethyl ketoxime
[c] = solution containing 50% water and 50% urea
[d] = Component I which is comprised of 84 wt.% of UF Concentrate 85, 5 wt. % melamine, ammonium acetate, 10.7 wt. % water, and 0.3 wt. %. UF Concentrate 85 is comprised of 60 wt. % formaldehyde, 25 wt. % urea and 15 wt. % water.

The above data shows that the stability of the amino resin binder system as disclosed herein can be substantially improved by the addition of an oxime compound.

EXAMPLES 15–27

Various samples of amino resin binder solutions as shown in Table II below, are prepared wherein various oxime compounds are used to improve the stability of the binder solutions.

TABLE II

| Example | Oxime | Oxime wt. % | Component I[a] wt. % | Urea Solution[b] wt. % | Alcohol Comp. | Alcohol wt. % |
|---|---|---|---|---|---|---|
| 15 | acetaldoxime | 4.65 | 51.94 | 41.54 | ethanol | 1.87 |
| 16 | hexanaldoxime | 4.65 | 51.94 | 41.54 | butanol | 1.87 |
| 17 | formaldoxime | 4.65 | 51.94 | 41.54 | ethylene glycol | 1.87 |
| 18 | crotonaldoxime | 6.52 | 51.94 | 41.54 | — | — |
| 19 | hexenaldoxime | 6.52 | 51.94 | 41.54 | — | — |
| 20 | benzaldoxime | 4.65 | 51.94 | 41.54 | — | — |
| 21 | methyl ethyl ketoxime | 6.52 | 51.94 | 41.54 | — | — |
| 22 | diethyl ketoxime | 6.52 | 51.94 | 41.54 | — | — |
| 23 | glyoxime | 6.52 | 51.94 | 41.54 | — | — |
| 24 | methyl glyoxime | 6.52 | 51.94 | 41.54 | — | — |
| 25 | methyl ethyl glyoxime | 6.52 | 51.94 | 41.54 | — | — |
| 26 | cyclohexanoxime | 6.52 | 51.94 | 41.54 | — | — |
| 27 | α-hydroxy isobutyl aldehyde oxime | 6.52 | 51.94 | 41.54 | — | — |

[a] = same as Component I of Table I
[b] = solution of 50 wt. % water and 50 wt. % urea

EXAMPLES 28-31

Four fiberboards were prepared by spraying the amino resin binder solutions, as set forth in Table III, onto mechanically reduced wood fibers until the particles became impregnated with the resin. The spray was regulated so that the resin solids content of the fiber was 8 percent of the oven dry (O.D.) weight of the fiber. The impregnated fibers were formed into a mat. The mat for boards 28 and 29 were compressed for 1 minute between press platens heated to about 145° C. using high frequency heating. The mats for boards 30 and 31 were compressed for 5 minutes between press platens heated to about 145° C.; high frequency heating was not used on these three boards.

TABLE III

| Example | 28 | 29 | 30 | 31 |
|---|---|---|---|---|
| Resin |  |  |  |  |
| Component$^d$ I wt. % | 51.92 | 51.92 | 51.92 | 51.92 |
| Urea Soln$^c$ wt. % | 41.54 | 41.54 | 41.54 | 41.54 |
| Oxime wt. % | 4.67$^a$ | 4.67$^b$ | 4.67$^a$ | 4.67$^b$ |
| Methanol wt. % | 1.87 | 1.87 | 1.87 | 1.87 |
| Catalyst | No | No | No | No |
| Board |  |  |  |  |
| Thickness in. | 0.471 | 0.472 | 0.482 | 0.476 |
| Density pcf | 45.6 | 45.9 | 47.2 | 47.1 |
| Modular Rupture psi | 3200 | 3700 | 3300 | 3500 |
| Internal bond psi | 56 | 97 | 62 | 53 |
| After 24 hr immersion in water |  |  |  |  |
| Water Absorption % | 32.5 | 32.1 | 23.9 | 21.4 |
| Thickness Swell % | 8.44 | 8.13 | 5.33 | 4.86 |
| Linear Expansion % | 0.40 | 0.60 | 0.21 | 0.38 |

$^a$ = acetoxime
$^b$ = methyl ethyl ketoxime
$^c$ = solution containing 50 wt. % urea and 50 wt. % water
$^d$ = component I is comprised of 84 wt. % UF Conc. 85, 5 wt. % melamine, 10.7 wt. % water and 0.3 wt. % ammonium acetate.

The data of Table III shows that fiberboards with acceptable physical properties can be produced with the presently disclosed and claimed amino resin binder system containing an oxime compound.

EXAMPLES 32-35

A binder solution was prepared containing the following ingredients:

|  | wt.% |
|---|---|
| Component I$^a$ | 51.92 |
| 50% urea/50% H$_2$O soln. | 41.54 |
| acetoxime | 4.67 |
| methanol | 1.87 |

$^a$ = same as Component I of Table I.

The solution was divided into two equal portions and allowed to age at room temperature; one portion for 15 days and the other for 25 days. Fiberboards were prepared using each of these portions; one on 15 days after preparation and the other on 25 days after preparation. A control fiberboard was also prepared at the same time and under the same conditions as the sample fiberboards.

The binder solution for the control boards were freshly prepared solutions comprised of:

|  | wt. % |
|---|---|
| Component I | 52.38 |
| 49.5 % urea/49.5 % H$_2$O soln. | 47.62 |
| 1.0 wt. % ammonium nitrate |  |

All fiberboards were prepared as set forth in Example 15 through 18 and the properties of each board are shown in Table IV.

TABLE IV

| Example | 32 | 33 | 34 | 35 |
|---|---|---|---|---|
|  | 15 days | Control | 25 days | Control |
| Thickness in. | 0.470 | 0.470 | 0.473 | 0.471 |
| Density pcf | 44.7 | 45.0 | 45.4 | 45.4 |
| Modular Rupture psi | 3600 | 4300 | 3400 | 4100 |
| Internal bond psi | 141 | 152 | 114 | 123 |
| After 25 hr. immersion in water |  |  |  |  |
| Water absorption % | 45.1 | 35.4 | 46.4 | 43.4 |
| Thickness Swell % | 10.4 | 7.6 | 11.1 | 8.6 |
| Linear Expansion % | 0.51 | 0.45 | 0.51 | 0.48 |

These examples illustrate that even 25 days after preparation, the present binder solutions are still stable and are able to be used to produce fiberboards having substantially the same properties as those fiberboards prepared from freshly made binder solutions.

What is claimed is:

1. A curable amino resin binder system comprised of urea, formaldehyde, water, a stabilizing amount of an oxime compound which is soluble in the binder system, wherein the binder system has a pH from about 6.5 to 7.5

2. The binder system of claim 1 comprising:
   (a) about 25 to 50 wt. % urea;
   (b) about 20 to 40 wt. % formaldehyde;
   (c) about 20 to 40 wt. % water;
   wherein all weight percents are based on the total weight of the binder system.

3. The binder system of claim 2 wherein the oxime compound is selected from the group consisting of aldoximes, ketoximes, glyoximes, and α-hydroxy oximes.

4. The binder system of claim 3 wherein the oxime is acetaldoxime or acetoxime.

5. The binder system of claim 1 wherein additionally contains a water misible alcohol compound.

6. The binder system of claim 1 being an aqueous solution.

* * * * *